Feb. 21, 1928.
A. MARCHEV
1,659,919
TENSION MEASURING DEVICE
Filed Dec. 5, 1924      3 Sheets-Sheet 3
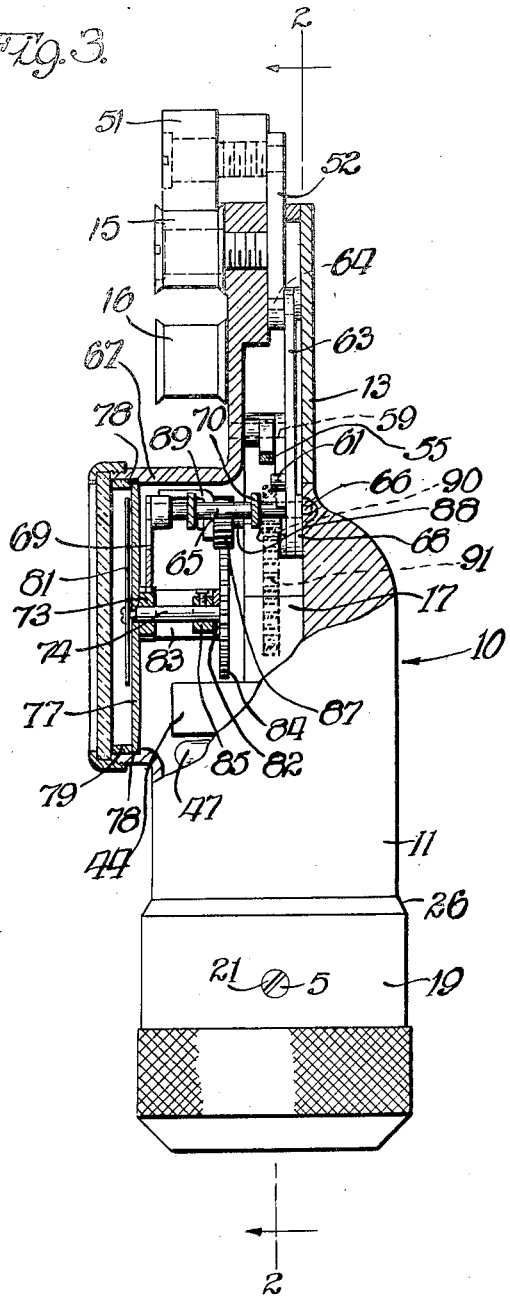
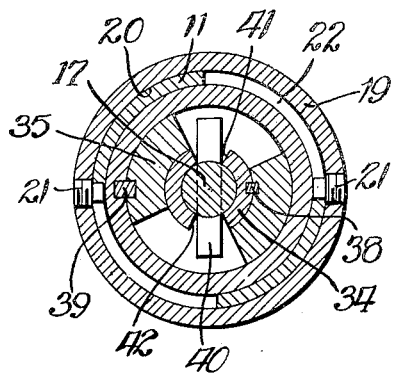
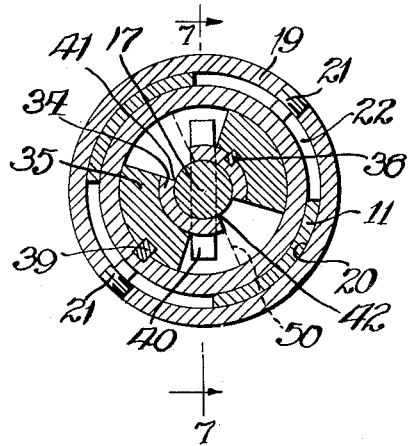
Inventor
Alfred Marchev
by H.A. Mattison Atty.

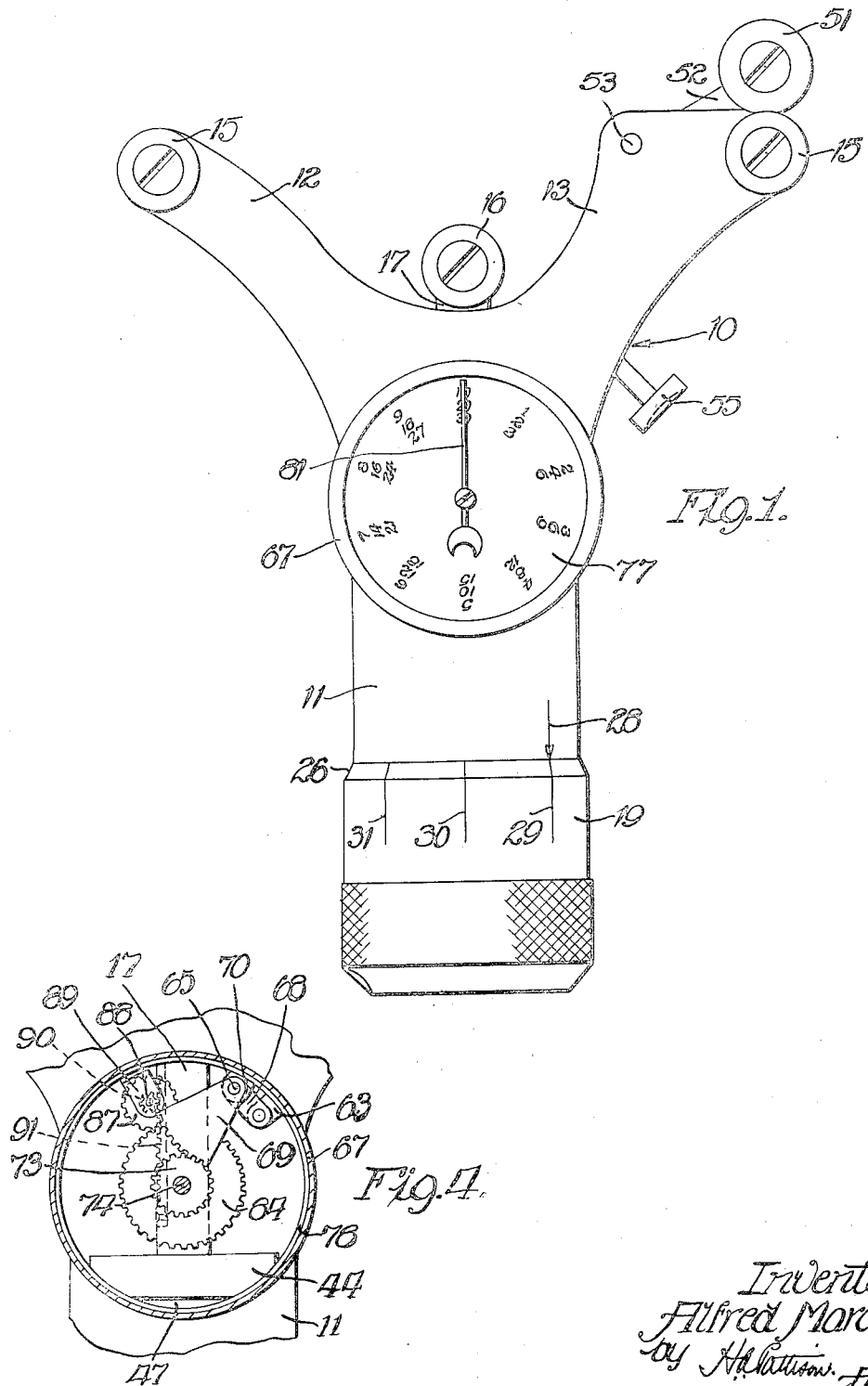

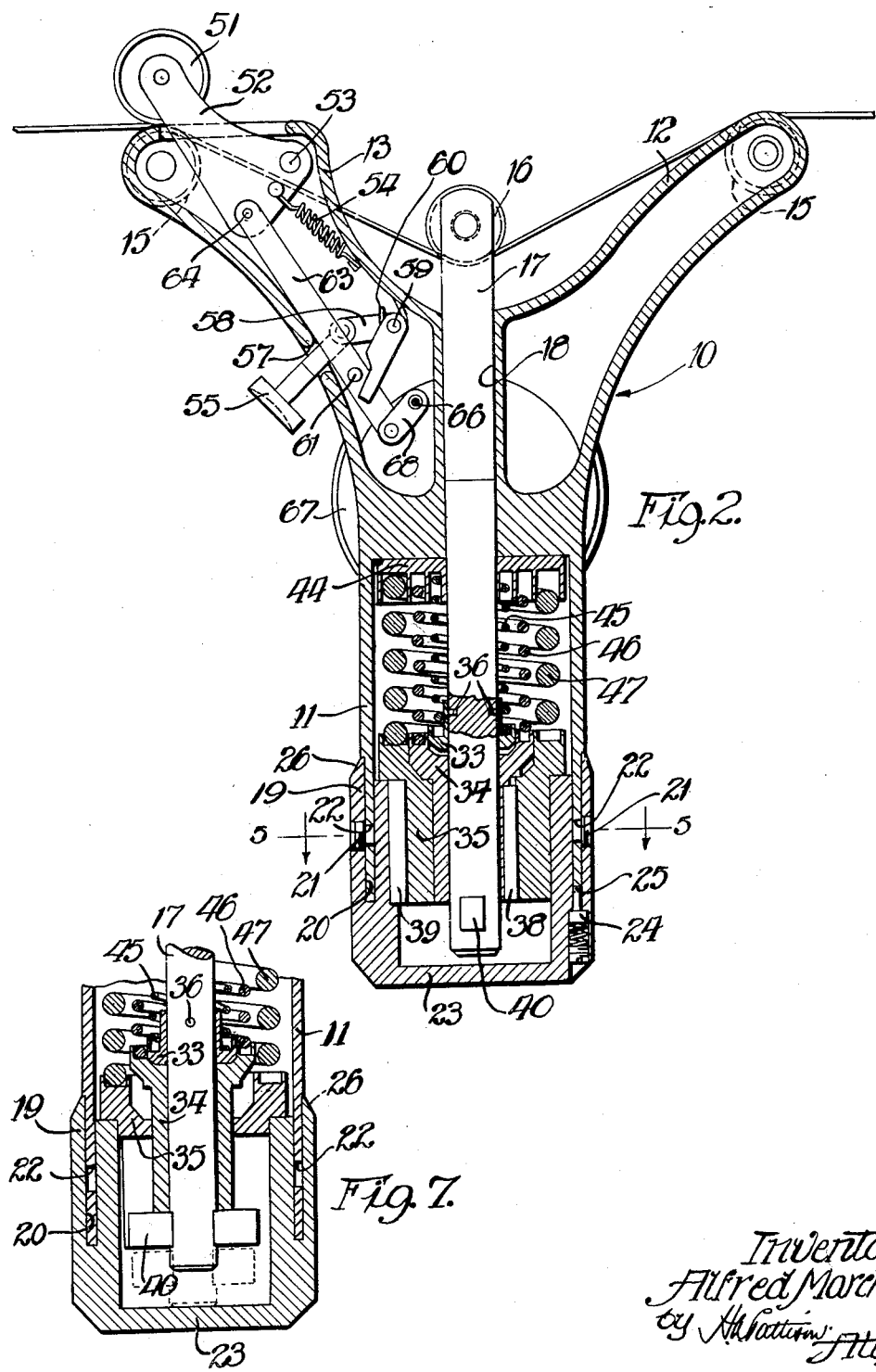

Patented Feb. 21, 1928.

1,659,919

UNITED STATES PATENT OFFICE.

ALFRED MARCHEV, OF CICERO, ILLINOIS, ASSIGNOR TO WESTERN ELECTRIC COMPANY, INCORPORATED, OF NEW YORK, N. Y., A CORPORATION OF NEW YORK.

TENSION-MEASURING DEVICE.

Application filed December 5, 1924. Serial No. 754,019.

This invention relates to tension measuring devices, and more particularly to a device for measuring the tension in strand material.

The object of the invention is to provide an improved tension measuring device which may be easily and quickly applied to strand material and readily adapted for measuring widely differing ranges of tension and varying shapes and sizes of strand material.

In order to attain the above mentioned object in accordance with the features of the invention, there are provided in one embodiment of the invention, three spaced rollers adapted to engage a strand, the tension of which is to be measured, the outer rollers being mounted on a frame which forms a handle for the device. The movement of the intermediate roller relative to the other rollers, due to the tension in the wire, is resisted by one or more springs within the handle which are selected according to the range of tensions which may exist in the strand, and the roller is operatively connected to an indicator needle cooperating with a rotatable calibrated dial to indicate the tension in the strand. A fourth roller for engaging the strand is pivotally supported upon the frame and normally in engagement with one of the outer rollers and is operatively connected through suitable linkage and gearing to the calibrated rotatable dial. When the engaged rollers are separated by manual means to permit the insertion of the strand under tension therebetween, the dial position is automatically corrected by a movement thereof relative to the needle and in advance thereof through the movement of the fourth roller.

It is believed that the invention will be clearly understood from the following description and the accompanying drawings illustrating one embodiment of the invention, in which Fig. 1 is an elevation of the improved tension measuring device;

Fig. 2 is a sectional view taken upon the line 2—2 of Fig. 3, looking in the direction indicated by the arrows, showing the device applied to a wire under tension;

Fig. 3 is a side view thereof partly in section;

Fig. 4 is a detail view of the mechanism behind the dial;

Fig. 5 is a sectional view taken upon the line 5—5 of Fig. 2, looking in the direction indicated by the arrows, showing the parts in position for measuring a minimum range of tension values;

Fig. 6 is a similar view showing the parts in position for measuring a range of tension values intermediate the minimum and maximum ranges, and Fig. 7 is a fragmentary sectional view similar to Fig. 2 taken upon the line 7—7 of Fig. 6, looking in the direction indicated by the arrows, showing the parts in a position corresponding to that shown in Fig. 6.

Referring to the drawings, 10 indicates a Y-shaped frame having a cylindrical handle portion 11 at one end and diverging arms 12 and 13 at the other end. The arms 12 and 13 each rotatably support a roller 15 and midway thereof and upon a lower plane as viewed in the drawings is a third roller 16 rotatably supported upon a shaft 17. To prevent rotation of the shaft 17 the upper end thereof is square in cross section and is reciprocably mounted in a channel 18 formed axially in the frame 10.

The lower end of the handle portion 11 is somewhat reduced in diameter and rotatably mounted thereon is an indexing sleeve 19 provided with a continuous circular channel 20 within which the reduced portion of the handle is mounted. At diametrically opposite points the sleeve 19 is provided with pins 21 which project inside the outer circular wall of the sleeve and ride in arc shaped slots 22 formed in the reduced portion of the handle 11, the purpose of which will be made clear as the description progresses. The slots 22 (Figs. 5 and 6) are formed in the handle 11, having corresponding points 180° apart, and extend therearound substantially 90°. The sleeve 19 is provided with a bottom wall 23 and mounted therein in line with the reduced portion of the handle 11 is a spring pressed retaining pin 24, the engaging end of which is suitably formed to snap into or cut of a plurality of V-shaped notches 25 formed in the end of the reduced portion of the handle 11. In the particular embodiment illustrated, three equally spaced notches 25 are provided within an angular distance of 90°. Marked upon the periphery of the handle 11 above an inwardly tapering surface 26 formed on the upper end of the sleeve 19 is an index 28 (Fig. 1) in the form of an arrow. Cooperating with the index 28 are three lines 29, 30, and 31, all within a range of 90° which may be marked in different colors. In the drawings the index 28 is shown in line with the line 29 which indicates the first range of the device and in this position the pin 24 is engaged in one of the notches 25, thereby retaining the setting of the sleeve.

Upon turning the indexing sleeve 19 to the right as viewed in Fig. 1, the lines 30 and 31, respectively, and denoting second and third ranges of the device may be indexed in succession with the index 28 and retained thereat through the spring pressed pin 24 engaging in the corresponding notch 25. Nested within the handle 11 and the sleeve 19 are three shouldered sleeves 33, 34, and 35, the upper ends of which form spring seats. The sleeve 33 is pinned to the shaft as indicated at 36 (Figs. 2 and 7) while the sleeves 34 and 35 are keyed together for rotary movement by a key indicated at 38, and the sleeve 35 and the indexing sleeve 19 are keyed together as indicated at 39. The shaft 17 at one end carries a cross bar 40, square in cross section, which as clearly illustrated in Figs. 2, 5, 6, and 7 operates in oppositely disposed slots 41 and 42 formed longitudinally in the sleeves 34 and 35, respectively. Mounted between each of the seats formed in the sleeves 33, 34, and 35 and a spring seating cup 44 resting within the handle 11 are compression springs 45, 46, and 47, respectively. The spring 45 is the weakest and consequently is adapted to be used in measuring the tension of wires within the minimum range which is from 0 to 10 pounds. Springs 45 and 46 when used together are adapted for the intermediate range of tension which is from 0 to 20 pounds and all three springs 45, 46, and 47 are adapted for the maximum range of tension of 0 to 30 pounds. However the latter two combinations are preferably employed for measuring tensions within the ranges of 10 to 20 and 20 to 30 pounds, respectively. In Figs. 2 and 5 the device is shown as set for the minimum range of tension and consequently when the shaft 17 is moved upwardly by the tension in the wire being tested as will clearly be explained in the description of the operation, the only resistance that is met is that of the spring 45. In this position it will be apparent, by referring to Fig. 5, that the bar 40 as it moves upwardly due to the movement of the shaft 17 has a clear path within the slots 41 and 42 in the sleeves 34 and 35. To set the device for the intermediate range of tensions the indexing sleeve 19 is turned to the right, as viewed in Fig. 1, until the line 30 is in line with the index 28 marked upon the handle 11 whereupon the pin 24 snaps into the corresponding notch 25 and retains the sleeve in its set position. In indexing the sleeve 19 to the line 30 the sleeve 34 is rotated through the keys 39 and 38 a sufficient distance as clearly indicated in Fig. 6 which will move the oppositely disposed slots 41 and 42 from parallel alinement with the bar 40 as illustrated in Fig. 5. In this position the shaft 17 as it moves upwardly due to the tension in the wire being tested, will cause the bar 40 which is at this time positioned below the sleeves as illustrated in dotted outline in Figs. 2 and 7, to engage the wall of the sleeve 34 and thereby move the sleeve upwardly and consequently increase the resistance to such movement due to the spring 46 being brought into action. When the device is to be used for the maximum range of tension values the sleeve 19 is turned until the line 31 is alined with the index 28 and is retained thereat by the cooperating pin 24 and notch 25 as explained before. During this movement the sleeve 35 is rotated through the key 39 to bring the wall of the sleeve 35 under the bar 40 as indicated in dotted outline by the numeral 50 in Fig. 6. In this position when the bar 40 is moved upwardly the sleeve 35 will also move upwardly and consequently bring into action the spring 47, thereby offering a maximum resistance to the movement upward of the shaft 17 since all three springs are brought into action. It is to be understood that the sleeves 19 and 35 and the sleeves 35 and 34 are keyed together for rotary movement in such a manner that a relative vertical movement as viewed in Fig. 2 may take place between these parts.

It will readily be apparent that to arrive at the true tension on the wire to be tested, it will be necessary to allow for the diameter of the wire to be tested due to the varying angle of deflection of the wire between the rollers 15 and 16, which angle of deflection will depend on the diameter of the particular wire to be tested and this is accomplished by moving the dial ahead of the indicating means, such movement being greater with a larger diameter wire. No matter what the diameter of the wire to be tested may be as long as it is within the range of the device, the dial reading is automatically corrected. In the case of a wire having no tension the indicating means remains stationary and at zero and the dial is rotated clockwise as viewed in Fig. 1 away from the indicating means, a distance corresponding to the diameter or shape of the wire. Upon applying the device to a wire having tension, the dial will of course move ahead of the indicating means as just described to correct the dial reading for the diameter of the wire but simultaneously therewith the indicating means will also move clockwise and the net result of these movements will be to so position the indicating means with relation to the dial that the true tension of the wire can be read directly on the dial. The means for accomplishing this will now be described. Mounted directly above the roller 15 carried upon the arm 13 is a second roller 51 carried upon a lever 52 pivotally supported upon the arm 13 as indicated at 53. The rollers 15 and 51 are normally held in peripheral engagement by a tension spring 54 suitably secured at opposite ends to the lever 52 and arm 13 as clearly illustrated in Fig. 2. When mounting the device upon a wire to be tested the roller 51 is moved away from the roller 15 to allow the wire to be entered therebetween through a thumb button 55, the shank of which extends through a slot 57 formed in the arm 13 and is attached to the short arm of a bell crank lever 58 pivotally supported upon a pin 59. A coil spring indicated at 60 suitably mounted upon the pin 59 with one arm resting against the wall of the arm 13, functions to normally turn the lever 58 in a counter-clockwise direction. The long arm of the lever 58 is adapted to engage a pin 61 mounted in a link 63 which at one end is pivotally connected as indicated at 64 to the lever 52. It will readily be seen that upon pressing the button 55 inwardly that the lever 58 will be turned in a clockwise direction, thereby bringing the long arm thereof into engagement with the pin 61 and through the link 63 and lever 52 cause the roller 51 to be raised from engagement with the roller 15 and also that upon applying the device to the wire and releasing the button 55 the spring 54 will retain the roller 51 in pressing engagement with the wire to be tested as indicated in Fig. 2. The other end of the link 63 is pivotally connected to a lever 68 secured to a pin 65 (Fig. 4) which is journaled at one end as indicated, at 66 in the rear wall of the frame 10 (Fig. 3), the other end projecting into a dial housing 67 and carrying a gear segment 69 (Figs. 3 and 4). A bracket 70 secured upon the inside circular wall of the housing 67 supports the end of the pin 65 carrying the gear segment 69. The gear segment 69 meshes with a gear 73 rotatably mounted upon a shaft 74. Suitably secured to one face of the gear 73 (Fig. 3) is a dial 77 the peripheral surface of which is freely rotatable upon a shoulder 78 formed in the inside circular wall of the housing 67. A ring 79 suitably spaced from the dial 77 and secured to the housing provides a suitable bearing for the dial 77.

The dial 77 (Fig. 1) is provided with three sets of graduations, the outer set reading from 0 to 10, the middle set in multiples of two from 0 to 20 and the inside set in multiples of three from 0 to 30, all representing the tension in pounds. The movement of the roller 51 away from the roller 15 which movement corresponds to the diameter of wire to be tested, is transmitted through the lever 52, link 63, lever 68, segment 69 and gear 73 at a suitable gear ratio to the dial 77 which is turned in a clockwise direction away from the indicator needle as viewed in Fig. 1 a sufficient distance to correct the dial reading for the diameter of the wire as explained heretofore.

The shaft 74 projects through the dial 77 and suitably secured to its end is an indicator needle 81. The opposite end of the shaft 74 is also supported by the floating dial 77 through a cleat or bridge member 82, the arms 83 (Fig. 3) being secured to the rear face of the dial 77. Upon the shaft 74 to the rear of the cleat 82 is a gear 84, and a collar 85 locked to the shaft 74 functions to prevent relative longitudinal movement between the shaft 74 and the cleat 82.

The gear 84 meshes with a smaller gear 87 (Figs. 3 and 4) which is secured to one end of a shaft 88 journaled in a bracket 89 carried from the inner circular wall of the housing 67. Upon the opposite end of the shaft 88 is a pinion 90 which meshes with a rack 91 secured within a socket formed in one side face of the shaft 17 (Figs. 3 and 4). The upward movement of the shaft 17 when the device is applied to a wire under tension is transmitted at a suitable gear ratio through the rack 91, pinion 90, gears 87 and 84 to the indicator needle 81 which is given a clockwise movement as viewed in Fig. 1 to indicate upon the dial 77 the true tension on the wire, the operator merely bearing in mind what range of tension values the device is set for in reading the dial. The selected range is also indicated by the position of the index 28 relative to the lines 29, 30, and 31.

The principle on which the design of the device is based is that in any balanced system of forces acting on a point the resultant is zero. For example, if a wire is engaged by the rollers 15 and deflected by the roller 16 intermediate the rollers 15 through the associated spring or springs, there exists a system of forces in equilibrium, and if the angle of deflection of the wire and the force required to produce this deflection be known, it is possible to calculate the tension in the wire. When properly calibrated the device heretofore described provides a convenient method of obtaining this information without the setting of sensitive adjusting devices to take care of different sizes or shapes of wire, as will be evident from the following description of the mode of operation.

In the operation of the device after first indexing the sleeve 19 in accordance with the range of tension which may exist in the wire or other strand which is to be measured the wire is placed between the rollers 15 and 51 at one side of the device and under and over the rollers 16 and 15, respectively, by gripping the handle portion 11 and moving the roller 51 away from the roller 15 through pressure of the thumb upon the button 55 as explained heretofore. The movement of the roller 51 is immediately transferred to the dial 77 which is rotated away from or ahead of the indicator needle 81 to correct the dial reading for the diameter or shape of the wire being tested and simultaneously with the movement of the dial the movement upwardly of the roller 16 due to the tension in the wire is transmitted through the rack 91, pinion 90, gears 87 and 84 to the indicator needle 81 which is rotated clockwise and the position at which it comes to a rest upon one or the other of the three graduations upon the dial 77 will indicate in pounds the true tension on the wire.

From the foregoing description it will be seen that the device described is very practical and efficient in the arrangement of its parts and that it can be operated with but very little skill on the part of an operator, and it will be clearly understood that the device can be applied to various forms and kinds of strands positioned either horizontally, vertically or otherwise, and may also be readily adapted to stationary strands, although particularly devised and illustrated in the drawings for measuring the tension in running strands.

What is claimed is:

1. A device for measuring the tension in material, comprising a frame having a plurality of members for engaging the material, one of said members adapted to deflect the portion of the material between two of the other members, a plurality of resilient members for controlling said deflecting member, a plurality of coaxially arranged members for successively associating said elements with said deflecting member for cumulative action according to the range of tension desired, and means operatively connected to said member for indicating the amount of tension in the material engaged.

2. A device for measuring the tension in material, comprising a frame having a plurality of members for engaging the material, one of said members adapted to deflect the portion of the material between two of the other members, a plurality of springs for controlling said deflecting member, a plurality of coaxially arranged members for successively associating a predetermined number of said springs with said deflecting member for cumulative action according to the range of tension desired and simultaneously rendering other of said springs ineffective, and means operatively connected to said member for indicating the amount of tension in the material engaged.

3. A device for measuring the tension in material, comprising a frame having a plurality of members for engaging the material, one of said members adapted to deflect the portion of the material between two of the other members, a plurality of compression springs for controlling said deflecting member, means for causing one of said springs to individually control said member for a predetermined range of tension, means coaxially arranged with said first means for causing another of said springs to cooperate with the one first brought into action throughout another predetermined range of tension, and means operatively connected to said member for indicating the amount of tension in the material engaged.

4. A device for measuring the tension in material, comprising a frame having a plurality of members for engaging the material, one of said members adapted to deflect the portion of the material between two of the other members, a plurality of nested compression springs for controlling said deflecting member, indexing means coaxially arranged with said springs for successively causing a predetermined number of said springs to control said member for cumulative action according to the range of tension desired and indicate the range, and means operatively connected to said member for indicating the amount of tension in the material engaged.

5. A device for measuring the tension in material, comprising a frame having a plurality of members for engaging the material, one of said members mounted reciprocably in said frame and adapted to deflect the portion of the material between two of the other members, a plurality of nested compression springs of differing tensions adapted to control said deflecting member, and indexing means coaxially arranged with said springs for successively bringing said springs into action in predetermined numbers to control said member for cumulative action according to the range of tension desired and indicate the range, and means operatively connected to said member for indicating the amount of tension in the material engaged.

6. A device for measuring the tension in material, comprising a frame having a plurality of members for engaging the material, one of said members mounted reciprocably in said frame and adapted to deflect the portion of the material between two of the other members, a plurality of springs for controlling said deflecting member, a plurality of coaxially arranged members for successively associating a predetermined number of said springs with said deflecting member for cumulative action according to the range of tension desired and another number of said springs with said deflecting member for another desired range of tension, indicating means associated therewith for denoting the selected range of tension, and means operatively connected to said member for indicating the amount of tension in the material engaged.

7. A device for measuring the tension in material, comprising a frame having a plurality of members for engaging the material, one of said members adapted to deflect the portion of the material between two of the other members, means operatively connected to said deflecting member and including two relatively movable members for indicating the amount of tension in the material, and means operated simultaneously with the application of the device to the material to be tested to alter the position of one of the relatively movable members of the indicating means to make a correction for the size of the material engaged.

8. A device for measuring the tension in material, comprising a frame having a plurality of members for engaging the material, one of said members adapted to deflect the portion of the material between two of the other members, means operatively connected to said deflecting member for indicating the amount of tension in the material, a calibrated rotatable dial upon which the tension is indicated, and means responsive during the application of the device to the material to be tested designed to position the dial relative to the indicating means to making a correction for the size of the material.

9. A device for measuring the tension in material, comprising a frame having a pair of members for engaging the material, an intermediate member adapted to deflect the portion of the material between two of the other members, means operatively connected to said deflecting member for indicating the amount of tension in the material, a fourth member also arranged to engage the material to be tested upon the engagement of the device with the material, and means interconnecting the fourth member with the indicating means whereby the latter is operated upon applying the device to the material to make a correction for the size thereof.

10. A device for measuring the tension in material, comprising a frame having a plurality of members for engaging the material, one of said members adapted to deflect the portion of the material between two of the other members, means operatively connected to said member for indicating the amount of tension in the material, and means operated simultaneously with the application of the device to the material to be tested to operate the indicating means to make a correction for the size of the material, said means including a resiliently controlled pivotal element normally in engagement with one of said members, manually controlled means comprising a bell crank lever for disengaging said pivotal element from its associated member upon applying the device to the material, and means for returning said lever to its normal position after operation thereof.

In witness whereof, I hereunto subscribe my name this 24th day of November, A. D., 1924.

ALFRED MARCHEV.